STABILIZED SYSTEM CONTAINING METAL HYDROXYALKYL PHOSPHONIC ACID OR PHOSPHINIC ACID

Anthony Dominic DiBattista, 19 Douglas Place, Eastchester, N.Y. 10707, and John Denon Spivack, 1 Blue Jay St., Spring Valley, N.Y. 10977
No Drawing. Continuation of abandoned application Ser. No. 854,281, Aug. 29, 1969. This application Dec. 21, 1971, Ser. No. 210,584
Int. Cl. C08k *1/58, 1/60*
U.S. Cl. 252—400 A         15 Claims

ABSTRACT OF THE DISCLOSURE

Organic materials normally subject to oxidative deterioration are stabilized by incorporating therein a metal derivative of monobasic or dibasic hindered phenol substituted phosphonic acid and one or more of the additional additives selected from phenolic antioxidants, synergists, ultraviolet light absorbers, ultraviolet light stabilizers, buffers, pigments, or delustering agents, dyes, dyesites and phosphites.

---

This is a continuation of application Ser. No. 854,281 filed on Aug. 29, 1969, and now abandoned.

DETAILED DESCRIPTION

This invention relates to the stabilization of organic materials normally subject to deterioration by exposure to heat and light by incorporating therein a combination of additives comprising a metal derivative of phenol substituted alkylhydroxyphenylalkylphosphonic acids and phosphonic acid half-esters or a metal and metal complex salts of hindered phenolic alkylphosphinic acid, phenolic antioxidants, ultraviolet light absorbers, ultraviolet light stabilizers, pigments or dyes, synergists, phosphites, alkaline earth stearate buffers and light stabilizers.

The metal derivatives of alkylhydroxyphenylalkylphosphonic acid and phosphonic acid half-esters of this invention may be represented by formula:

$$[E]_m M_x [G]_p$$

wherein

M is a metal having an available valence of from 1 to 4;
G is an anion having an available valence of from 1 to 3; and
E is of the formula:

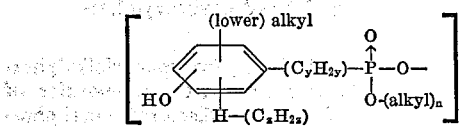

wherein $z$ has a value of from 0 to 6,
$y$ has a value of from 1 to 4,
$n$ has a value of from 0 to 1,
$m$ has a value of from 1 to 3,
$x$ has a value of from 1 to 2, and
$p$ has a value of from 0 to 3, $n$, $m$, $p$ and $x$ being so selected as to satisfy the expression $$\frac{(2-n)_m}{x} + \frac{(r)_p}{x} = v$$

wherein $r$ is the valence of anion G and has a value of from 1 to 3 and $v$ is the available valence of M.

The group M consist either of a metal in full free valence state such as sodium, cadmium, zinc, barium, nickel, aluminum, tin, chromium, cobalt, iron, copper, titanium, vanadium, and the like, or of a metal derivative in which part but not all of its full free valence state is satisfied by alkyl substitution, e.g. dialkyltin. Preferably M is a metal in its full free valence state, particularly those having a valence of 2 to 4 such as cadmium, zinc, barium, nickel, iron, copper, aluminum, tin, chromium, titanium, vanadium, and cobalt. Of these, aluminum and the transitional metals, particularly nickel, are especially useful.

The available valence bonds of the metal will be satisfied by one or more phosphonate or O-alkyl phosphonate groups and, if needed, by anions, organic or inorganic. Thus when $n=0$, there may be one ($m-1$) or more ($m=2$ or 3) phosphonate groups. Likewise there may be one or more O-alkyl phosphonate groups ($n=1$). In some instances, as in the case of aluminum or chromium, three phosphonate groups combined with two metal atoms ($x=2$) to satisfy the valence requirements. In the case of mixed salts, one, two or three monovalent anions will make up the valence requirements. In all instances, the compounds will contain at least one phosphonate group or at least one O-alkyl phosphonate group and the values of $n$, $m$, $p$ and $x$ is such that the following expression is satisfied:

$$\frac{(2-n)_m}{x} + \frac{(r)_p}{x} = v$$

wherein $r$ is the valence of anion G and has a value of from 1 to 3 and $v$ is the available valence of M.

The anion G may be organic or inorganic. Illustrative of such organic anions are carboxylate, such as those derived from carboxylic acids containing from 1 to 30 carbon atoms, preferably 2 to 18 carbon atoms, e.g. acetate, laurate, stearate, benzoate, malonate, maleate, succinate, and the like; phenates and alkyl substituted phenates; alkyl- and aryl-sulfates and -sulfonates; alkyl- and aryl-phosphates and -phosphonates; and inorganic anions such as chloride, bromide, fluoride, nitrate, cyanide, cyanate, sulfate, and the like.

As the embodiments of this invention, mention is made of compounds of the formulae:

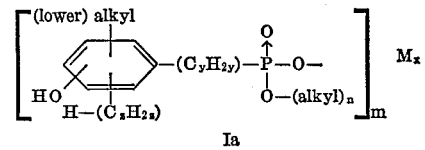

Ia wherein M, z, y, n, m and x have the values defined above;

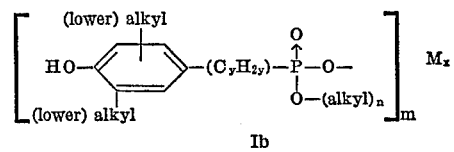

Ib wherein M, y, n, m and x have the values defined above; and most preferably

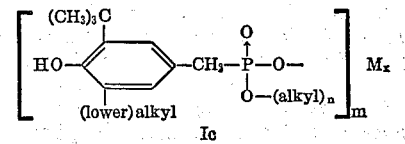

Ic wherein

M is a metal having an available valence of from 2 to 3 and is selected from cadmium, zinc, barium, nickel, aluminum, tin, chromium or cobalt; and
$n$, $m$ and $x$ have the values defined above.

By the term "alkyl" when used in this specification and the appended claims, is intended a branched or straight-chained saturated hydrocarbon group having from 1 to about 30 carbon atoms. When qualified by the term "(lower)", the hydrocarbon chain will contain from 1 to about 6 carbon atoms. Typical of such alkyl groups are thus methyl, ethyl, propyl, isopropyl, butyl, t-butyl, pentyl, isopentyl, hexyl, octyl, t-octyl, decyl, tetradecyl, hexadecyl, octadecyl, eicosyl, docosyl, triacontyl and the like.

The phenyl group of phosphonate moiety is substituted by a hydroxy group and one ($z=0$) or two ($z=1$ to 6) (lower) alkyl groups. These substitutents may be located on the phenyl group in a number of ways. From the standpoint of maximizing the antioxidant properties, it is generally desirable to utilize a 3,5-dialkyl-4-hydroxyphenyl arrangement, e.g., 3,5-di-t-butyl-4-hydroxybenzylphosphonate. However, other arrangements such as 2-hydroxy-5-(lower)alkylphenyl are also within the scope of the present invention.

The following formulae, in which K represents the group:

$$\text{HO}-\underset{H-(C_xH_{2x})}{\underset{|}{\bigcirc}}-\underset{|}{\overset{(\text{lower})\text{alkyl}}{}}-(C_yH_{2y})-$$

are typical structures of the compounds of this invention without being a limitation thereof:

$$\left[\underset{\text{O-alkyl}}{\overset{O}{\underset{|}{K-\overset{\uparrow}{P}-O-}}}\right]_2 Ni \qquad \left[\underset{\text{O-alkyl}}{\overset{O}{\underset{|}{K-\overset{\uparrow}{P}-O-}}}\right]_3 Cr$$
(II) (III)

$$\left[\underset{\text{O-alkyl}}{\overset{O}{\underset{|}{K-\overset{\uparrow}{P}-O-}}}\right] NiCl$$
(IIa)

$$\left[K-\overset{O}{\underset{O}{\overset{\uparrow}{P}}}\diagdown_{O}\diagup Cd\right] \qquad \left[K-\overset{O}{\underset{O}{\overset{\uparrow}{P}}}\diagdown_{O}\diagup\right]_3 Al_2$$
(IV) (V)

$$\left[\underset{\text{O-alkyl}}{\overset{O}{\underset{|}{K-\overset{\uparrow}{P}-O-}}}\right]_2 Sn\diagup^{\text{alkyl}}_{\text{alkyl}} \qquad K-\overset{O}{\underset{O}{\overset{\uparrow}{P}}}\diagdown_{O}\diagup Sn\diagup^{\text{alkyl}}_{\text{alkyl}}$$
(VI) (VII)

The metal phosphonates of the present invention are prepared by treating a phosphonic acid or half-ester of the formula:

$$\text{HO}-\underset{H-(C_xH_{2x})}{\underset{|}{\bigcirc}}-\overset{(\text{lower})\text{alkyl}}{}-(CH_2)-\overset{O}{\underset{O-Z}{\overset{\uparrow}{P}}}-OH$$
(VIII)

wherein Z is hydrogen or alkyl, with the appropriate metal halide, such as the metal chloride. Preferably an alkali metal salt of VIII, such as the sodium or potassium salt, is employed. Generally the product is formed spontaneously or after a short reaction period and need only be freed of by-products, solvents, and unreacted starting material, if any, as by washing and extraction.

Illustrative examples of the metal phosphonates are:

sodium (O-butyl 3,5-di-t-butyl-4-hydroxybenzylphosphonate)
sodium (O-octadecyl 3,5-di-t-butyl-4-hydroxybenzylphosphonate)
sodium [O-dodecyl β-(3,5-di-t-butyl-4-hydroxyphenyl)ethylphosphonate
nickel bis(O-butyl 3,5-di-t-butyl-4-hydroxybenzylphosphonate)
nickel bis(O-octadecyl 3-methyl-4-hydroxy-5-t-butylbenzylphosphonate)
nickel bis(O-octadecyl 2-hydroxy-3,5-di-t-butylbenzylphosphonate)
cupric bis[O-hexadecyl-(3,5-di-t-butyl-4-hydroxyphenyl)propylphosphonate]
aluminum tris(O-butyl 3,5-di-t-butyl-4-hydroxybenzylphosphonate)
ferric tris[O-octadecyl α-(3,5-di-t-butyl-4-hydroxyphenyl)ethylphosphonate]
chromium tris(O-butyl 3,5-di-t-butyl-4-hydroxybenzylphosphonate)
cobalt bis(O-butyl 3,5-di-t-butyl-4-hydroxybenzylphosphonate)
stannous bis(O-butyl 3,5-di-t-butyl-4-hydroxybenzylphosphonate)
cadmium bis(O-butyl 3,5-di-t-butyl-4-hydroxybenzylphosphonate)
barium bis(O-btuyl 3,5-di-t-butyl-4-hydroxybenzylphosphonate)
zinc bis(O-butyl 3,5-di-t-butyl-4-hydroxybenzyl phosphonate)
dibutyltin bis (O-butyl 3,5-di-t-butyl-4-hydroxybenzylphosphonate)
barium 3,5-di-t-butyl-4-hydroxybenzylphosphonate
dialuminum tris(3,5-di-t-butyl-4-hydroxybenzylphosphonate)
cadmium 3,5-di-t-butyl-4-hydroxybenzylphosphonate
nickel 3,5-di-t-butyl-4-hydroxybenzylphosphonate
zinc 3,5-di-t-butyl-4-hydroxybenzylphosphonate
nickel bis(O-octadecyl 3,5-di-t-butyl-4-hydroxybenzylphosphonate)
dibutyltin (3,5-di-t-butyl-4-hydroxybenzylphosphonate)
nickel (O-n-butyl-3,5-di-t-butyl-4-hydroxybenzylphosphonate)-chloride
nickel (3,5-di-t-butyl-4-hydroxybenzylphosphonate)-acetate
di-nickel-bis-(O-n-butyl 3,5-di-t-butyl-4-hydroxybenzylphosphonate)sulfate
nickel bis(O-ethyl 3,5-dimethyl-4-hydroxybenzylphosphonate)
nickel bis(O-tetracosyl 3,5-diethyl-4-hydroxybenzylphosphonate)
nickel bis(O-triacontyl 3-methyl-4-hydroxybenzylphosphonate)
nickel bis(O-eicosyl 3-hexyl-6-methyl-4-hydroxybenzylphosphonate)
nickel bis(O-methyl 3,5-dihexyl-4-hydroxybenzylphosphonate)
nickel bis(O-octyl 3,6-di-isopropyl-4-hydroxybenzylphosphonate)
nickel bis(O-dodecyl 3-butyl-5-isopropyl-4-hydroxybenzylphosphonate)
nickel bis(O-decyl 5-t-butyl-4-hydroxybenzylphosphonate)

The metal derivatives of alkylhydroxyphenylalkylphosphinic acids that can be employed in the composition of this invention in place of the above discussed metal phosphonates are represented by the following formula:

$$\left[\text{HO}-\underset{H-(C_xH_{2x})}{\underset{|}{\bigcirc}}-\overset{(\text{lower})\text{alkyl}}{}-C_yH_{2y}-\overset{O}{\underset{R}{\overset{\uparrow}{P}}}-O-\right]_v M$$

wherein

M is a metal or metal complex cation, this cation having an available valence of from 1 to 4;
$z$ has a value of from 0 to 6;
$y$ has a value of from 1 to 4; and
$v$ has a value of from 1 to 4, the value of $v$ being the same as the available valence of M.

The group M consist either of a metal cation in a free valence state such as the cation form of lithium, sodium, potassium, copper, magnesium, calcium, zinc, strontium, cadmium, barium, aluminum, titanium, zirconium, tin, vanadium, antimony, chromium, molybdenum, manganese, iron, cobalt, and the like. Alternatively the group M may be a metal complex in which part but not all of the free valence state of the metal is satisfied by one or more organic or inorganic anions. Illustrative of such organic anions are the acyloxy group derived from carboxylic acids containing from 1 to 30 carbon atoms, preferably 2 to 18 carbon atoms, e.g., acetoxy, lauroyloxy, stearoyloxy, benzoyloxy, malonoyloxy, succinoyloxy, and the like; phenoxy including alkylphenoxy; alkyl; alkyl- and arylsulfates and -sulfonates; alkyl- and arylphosphates and -phosphonates and the like. Suitable inorganic anions include chlorides, bromides, fluoride, nitrate, cyanide, cyanate, sulfate and the like. Of these metal complexes, particularly useful species are represented by di-alkyltin and nickel monoacetate.

The phenylalkyl group of phosphinic acid moiety is substituted in the aromatic ring by a hydroxy group and one ($z=0$) or two ($z=1$ to 6) (lower)alkyl groups. These substituents may be located on the phenylalkyl group in a number of ways. From the standpoint of maximizing the antioxidant properties, it is generally desirable to utilize a 3,5-dialkyl - 4 - hydroxyphenylalkyl arrangement, e.g., 3,5-di-t-butyl-4-hydroxybenzylphosphinate. However, other arrangements such as 2-hydroxy-5-(lower)alkyl-phenylalkyl are also within the scope of the present invention.

Although the structural formula on page 3 is presented in relation to the principal primary valences exhibited by the metal M, it is well known that many metals, especially the transition metals also commonly exhibit secondary valence forces which can bind the metal to other species in the immediate environment in which these compounds are made or used.

This is especially apparent when such valences are electronegative in character. Such species may include moisture forming hydrates, alcohols, binding alcohol of crystallization, hydrocarbons, solvents especially aromatics, esters, ketones, etc. These metal phosphonate compounds may even bind with themselves, yielding aggregates in relatively non-polar medium rather than exist by themselves in monomeric forms. Thus if M is $Ni^{2+}$, as many as four additional secondary valence bonds may be involved in coordinating other molecules in the environment as described above.

The alkylhydroxyphenyl group is linked to the phosphinic acid group through a straight or branched chained alkylene group of from 1 to 4 carbon atoms, the number of carbon atoms ebing shown by the designation $y$.

In addition to the alkylhydroxyphenylalkyl group, the phosphorus atom of the phosphinic acid group bears a hydrocarbon group of from one to twelve carbon atoms. This hydrocarbon group may be an aliphatic hydrocarbon group, notably alkyl and preferably (lower) alkyl, a cycloaliphatic hydrocarbon group, such as cyclopentyl, or cyclohexyl, or an aromatic hydrocarbon group such as phenyl, naphthyl, xylyl, and the like.

A particularly useful subclass of the present invention are those compounds of the formula:

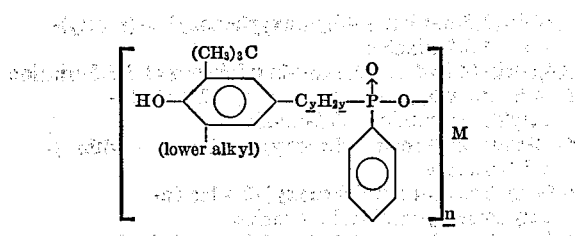

compounds in which y is 1.
wherein M, $n$ and $y$ are previously defined especially those compounds in which $y$ is 1.

Illustrative examples of the metal derivatives of phosphinic acids described above are:

sodium (3,5-di-t-butyl-4-hydroxybenzyl)benzene-phosphinate
barium bis-[(3,5-di-t-butyl-4-hydroxybenzyl)benzene-phosphinate
nickel bis-[(3,5-di-t-butyl-4-hydroxybenzyl)-benzenephosphinate]
aluminum tris-[(3,5-di-t-butyl-4-hydroxybenzyl)-benzenephosphinate]
tin bis-[(3,5-di-t-butyl-4-hydroxybenzyl)benzene-phosphinate]
dibutyltin bis-[(3,5-di-t-butyl-4-hydroxybenzyl)-benzenephosphinate]
nickel [(3,5-di-t-butyl-4-hydroxybenzyl)benzene-phosphinate]acetate
calcium bis-[(3,5-di-t-butyl-4-hydroxybenzyl)-benzenephosphinate]
zinc bis-[(3,5-di-t-butyl-4-hydroxybenzyl)-benzene-phosphinate]
sodium [2-(3,5-di-t-butyl-4-hydroxyphenyl)ethyl]-benzenephosphinate
nickel bis-[2-(3,5-di-t-butyl-4-hydroxyphenyl)ethyl]-benzenephosphinate
sodium [2(3,5-di-t-butyl-4-hydroxyphenyl)ethyl]-ethanephosphinate
aluminum tris[2-(3,5-di-t-butyl-4-hydroxyphenyl)-ethyl]ethanephosphinate
sodium (3-5-di-t-butyl-4-hydroxybenzyl)cyclohexane-phosphinate
nickel bis-[(3,5-di-t-butyl-4-hydroxybenzyl)cyclo-hexanephosphinate]
nickel bis[3,5-di-isopropyl-4-hydroxybenzyl)-benzenephosphinate]
nickel bis[3-methyl-4-hydroxybenzyl)benzene-phosphinate]
nickel bis[3,6-dimethyl-4-hydroxybenzyl)benzene-phosphinate]
nickel bis[3,5-diethyl-4-hydroxybenzyl)benzene-phosphinate]
nickel bis[3,6-di-n-hexyl-4-hydroxybenzyl)benzene-phosphinate]

The preparation of the above discussed metal derivatives of phosphinic acids is described in copending application Ser. No. 612,336, filed Jan. 30, 1967, now Pat. No. 3,488,368.

The antioxidants that are advantageously employed with the above mentioned phosphonic acids and esters are generally phenolic antioxidant compounds. Examples of the phenolic compounds are given below.

(1) Phenolic compounds having the general formula $$Q-(CH_2)_w-A$$

wherein
Q is

A is

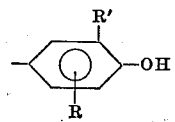

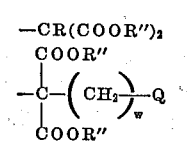

R is hydrogen or lower alkyl
R' is lower alkyl
R" is alkyl group having from 6–24 carbon atoms
w is an integer from 1 to 4.

Illustrative examples of the compounds shown above are

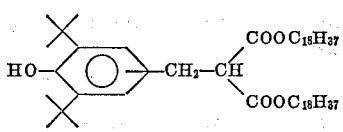

di-n-octadecyl(3-t-butyl-4-hydroxy-5-methylbenzyl) malonate
di-n-octadecyl α(3 - t - butyl-4-hydroxy-5-methylbenzyl) malonate which is disclosed in the Netherlands Patent No. 6711199, February 19, 1968
di-n-octadecyl - α,α′ - bis-(3-t-butyl-4-hydroxy-5-methylbenzyl)malonate which is disclosed in the Netherlands Patent No. 6803498, September 18, 1968.

(2) Phenolic compounds having the general formula

Illustrative examples of the compounds shown above are 2,6-di-t-butylphenyl
2,4,6-tri-t-butylphenol
2,6-dimethylphenol
2-methyl-4,6-di-t-butylphenol and the like.

(3) Phenolic compounds having the formula

2,2′-methylene-bis(6-t-butyl-4-methylphenol)
2,2′-methylene-bis(6-t-butyl-4-ethylphenol)
4,4′-butylidene-bis(2,6-di-t-butylphenol)
4,4′-(2-butylidene)-bis(2-t-butyl-5-methylphenol)
2,2′-methylene-bis[6-(1-methylcyclohexyl)-4-methylphenol]

and the like.

(4) Phenolic compounds having the formula

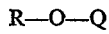

Illustrative examples of such compounds are 2,5-di-t-butylhydroquinone
2,6-di-t-butylhydroquinone
2,6-di-t-butyl-4-hydroxyanisole (5) Phenolic compounds having the formula

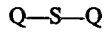

Illustrative examples of such compounds are 4,4′-thiobis-(2-t-butyl-5-methylphenol)
4,4′-thiobis-(2-t-butyl-6-methylphenol)
2,2′-thiobis-(6-t-butyl-4-methylphenol)

(6) Phenolic compounds having the formula

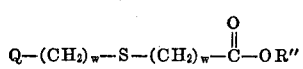

Illustrative examples of such compounds are octadecyl-(3,5-dimethyl-4-hydroxybenzylthio)-acetate
dodecyl-(3,5-di-t-butyl-4-hydroxybenzylthio)-propionate (7) Phenolic compounds having the formula

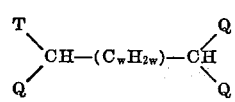

wherein T is hydrogen, R or Q as defined above.

Illustrative examples of such compounds are 1,1,3-tris(3,5-dimethyl-4-hydroxyphenyl)-propane
1,1,3-tris(5-t-butyl-4-hydroxy-2-methylphenyl)-butane
1,1,5,5-tetrakis-(3′-t-butyl-4′-hydroxy-6′-methylphenyl)-n-pentane (8) Phenolic compounds having the formula

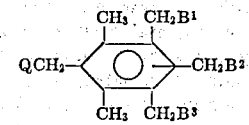

wherein $B^1$, $B^2$ and $B^3$ are hydrogen, methyl or Q, provided that when $B^1$ and $B^3$ are Q then $B^2$ is hydrogen or methyl and when $B^3$ is Q then $B^1$ and $B^2$ are hydrogen or methyl.

Illustrative examples of such compounds are 1,4-di(3,5-di-t-butyl-4-hydroxybenzyl)-2,3,5,6-tetramethylbenzene
1,3,5-tri(3,5-di-t-butyl-4-hydroxybenzyl)-2,4,6-trimethylbenzene (9) Phenolic compounds having the formula

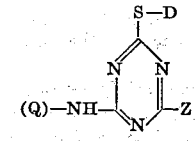

wherein

Z is NHQ, —S—D or —O—Q
D is alkyl group having from 6–12 carbon atoms or —$C_wH_{2w}$)—S—R″

Illustrative examples of such compounds are 2,4-bis-(n-octylthio)-6-(3,5-di-t-butyl-4-hydroxyaniline)-1,3,5-triazine
6-(4-hydroxy-3-methyl-5-t-butylanilino-2,4-bis-(n-octylthio)-1,3,5-triazine
6-(hydroxy-3,5-dimethylanilino)-2,4-bis-(n-octylthio)-1,3,5-triazine
6-(4-hydroxy-3,5-di-t-butylanilino)-2,4-bis-(n-octylthioethylthio)-1,3,5-triazine
6-(4-hydroxy-3,5-di-t-butylanilino)-4-(4-hydroxy-3,5-di-t-butylphenoxy)-2-(n-octylthio)-1,3,5-triazine
2,4-bis(4-hydroxy-3,5-di-t-butylanilino)-6-(n-octylthio)-1,3,5-triazine.

The above phenolic triazine stabilizers are more fully described in U.S. 3,255,191.

(10) Phenolic compounds having the formula

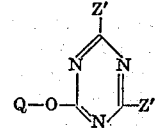

wherein Z′ is —O—Q, —S—D or —S—($C_wH_{2w}$)—SD

Illustrative examples of such compounds are 2,3-bis-(3,5-di-t-butyl-4-hydroxyphenoxy)-6-(n-octylthio)-1,3,5-triazine
2,4,6-tris-(4-hydroxy-3,5-di-t-butylphenoxy)-1,3,5-triazine
6-(4-hydroxy-3,5-di-t-butylphenoxy)-2,4-bis-(n-octylthioethylthio)-1,3,5-triazine
6-(4-hydroxy-3-methylphenoxy)-2,4-bis-(n-octylthio)-1,3,5-triazine
6-(4-hydroxy-3-t-butylphenoxy)-2,4-bis-(n-octylthioethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine 6-(4-hydroxy-3,5-di-t-butylphenoxy)-2,4-bis-(n-
octylthiopropylthio)-1,3,5-triazine
6-(4-hydroxy-3,5-di-t-butylphenoxy)-2,4-bis-(n-
dodecylthioethylthio)-1,3,5-triazine
2,4-bis-(4-hydroxy-3,5-di-t-butylphenoxy)-6-butylthio-
1,3,5-triazine
2,4-bis-(4-hydroxy-3,5-di-t-butylphenoxy)-6-(n-
octadecylthio)-1,3,5-triazine
2,4-bis-(4-hydroxy-3,5-di-t-butylphenoxy)-6-(n-
dodecylthio)-1,3,5-triazine
2,4-bis-(4-hydroxy-3,5-di-t-butylphenoxy)-6-(n-
octylthiopropylthio)-1,3,5-triazine
2,4-bis-(4-hydroxy-3,5-di-t-butylphenoxy)-6-(n-
octylthioethylthio)-1,3,5-triazine
2,4-bis-(4-hydroxy-3,5-di-t-butylphenoxy)-6-(n-
dodecylthioethylthio)-1,3,5-triazine.

The above phenolic triazine stabilizers are more fully
described in U.S. 3,255,191.

(11) Phenolic compounds having the formula

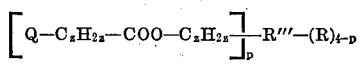

wherein p is an integer from 2 to 4 and
R''' is a tetravalent radical selected from aliphatic hydro-
carbons having from 1 to 30 carbon atoms,
aliphatic mono and dithioethers having from 1 to 30 car-
bon atoms, and aliphatic mono and diethers having
from 1 to 30 carbon atoms.

Illustrative examples of such compounds are

Sub-class I n-Octadecyl 3-(3,5-di-t-butyl-4-hydroxyphenyl)propionate
n-Octadecyl 3,5-di-t-butyl-4-hydroxyphenylacetate
n-Octadecyl 3,5-di-t-butyl-4-hydroxybenzoate
n-Hexyl 3,5-di-t-butyl-4-hydroxyphenylbenzoate
n-Dodecyl 3,5-di-t-butyl-4-hydroxyphenylbenzoate
Neo-dodecyl 3-(3,5-di-t-butyl-4-hydroxyphenyl)
propionate
Dodecyl β-(3,5-di-t-butyl-4-hydroxyphenyl)propionate
Ethyl α-(4-hydroxy-3,5-di-t-butylphenyl)-isobutyrate
Octadecyl α-(4-hydroxy-3,5-di-t-butylphenyl)isobutyrate
Octadecyl α-(4-hydroxy-3,5-di-t-butylphenyl)propionate Sub-class II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-
hydroxyphenylacetate
2-(n-octadecylthio)ethyl 3,5-di-t-butyl-4-hydroxybenzoate
2-(2-hydroxyethylthio)ethyl 3,5-di-t-butyl-4-
hydroxybenzoate
2,2'-Thiodiethanol bis(3,5-di-t-butyl-4-hydroxyphenyl)
acetate
Diethyl glycol bis-[3,5-di-t-butyl-4-hydroxyphenyl)
propionate]
2-(n-octadecylthio)ethyl 3-(3,5-di-t-butyl-4-
hydroxyphenyl)propionate
2,2'-Thiodiethanol-bis-3-(3,5-di-t-butyl-4-
hydroxyphenyl)propionate
Stearamido N,N-bis-[ethylene 3-(3,5-di-t-butyl-4-
hydroxyphenyl)propionate]
n-Butylimino N,N-bis-[ethylene 3-(3,5-di-t-butyl-4-
hydroxyphenyl)propionate]
2-(2-stearoyloxyethylthio)ethyl 3,5-di-t-butyl-4-
hydroxybenzoate
2-(2-hydroxyethylthio)ethyl 7-(3-methyl-5-t-butyl-4-
hydroxyphenyl)heptanoate
2-(2-stearoyloxyethylthio)ethyl 7-(3-methyl-5-t-butyl-4-
hydroxyphenyl)heptanoate Sub-class III 1,2-propylene glycol bis-[3-(3,5-di-t-butyl-4-
hydroxyphenyl)propionate]
Ethylene glycol bis-[3-(3,5-di-t-butyl-4-hydroxyphenyl)
propionate]
Neopentylglycol bis-[3-(3,5-di-t-butyl-4-hydroxyphenyl)
propionate]
Ethylene glycol bis-(3,5-di-t-butyl-4-
hydroxyphenylacetate)
Glycerine-1-n-octadecanoate-2,3-bis-(3,5-di-t-butyl-4-
hydroxyphenylacetate
Pentaethylthritol-tetrakis-3-3-(3,5-di-t-butyl-4-
hydroxyphenyl)propionate
1,1,1-trimethylol-tris-3-(3,5-di-t-butyl-4-hydroxyphenyl)
propionate
Sorbitol hexa-[3-(3,5-di-t-butyl-4-hydroxyphenyl)
propionate
1,2,3-butanetriol tris[3-(3,5-di-t-butyl-4hydroxyphenyl)
propionate]
2-hydroxyethyl 7-(3-methyl-5-t-butyl-4-hydroxyphenyl)
heptanoate
2-stearoyloxyethyl 7-(3-methyl-5-t-butyl-4-
hydroxyphenyl)heptanoate
1,6-n-hexanediol-bis[(3',5'-di-t-butyl-4-hydroxyphenyl)
propionate]

The above phenolic ester stabilizers of sub-classes I, II
and III are more fully described in U.S. 3,330,859, Ser.
No. 354,464, filed Mar. 24, 1964, now Pat. No. 3,441,575
and Ser. No. 539,460, filed Apr. 13, 1964 now abandoned,
respectively.

(12) Phenolic compounds having the formula

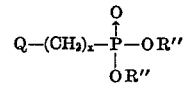

Illustrative examples of such compounds are

Dioctadecyl 3,5-di-t-butyl-4-hydroxybenzylphosphonate
Di-n-octadecyl 3-t-butyl-4-hydroxy-5-methyl-
benzylphosphonate
Di-n-octadecyl 1-(3,5-di-t-butyl-4-hydroxy-phenyl)-
ethanephosphonate
Di-n-tetradecyl 3,5-di-t-butyl-4-hydroxybenzyl-
phosphonate
Di-n-hexadecyl 3,5-di-t-butyl-4-hydroxybenzyl-
phosphonate
Didocosyl-3,5-di-t-butyl-4-hydroxybenzylphosphonate
Di-n-octadecyl 3,5-di-t-butyl-4-hydroxybenzyl-
phosphonate The above di-(higher)alkyl phenolic phosphonates are
more fully described in U.S. 3,281,505.

Ultraviolet light absorbers can be additionally em-
ployed with the additives mentioned above. Any known
UV absorbers are useful in this invention as, for example,
salicylates, benzophenones, benzotriazoles, acrylates and
the like. Illustrative examples of UV absorbers are 2-Hydroxy-4-methoxybenzophenone
2,2'-Dihydroxy-4-methoxybenzophenone
2-Hydroxy-4-methoxy-2'-carboxybenzophenone
2,2-Dihydroxy-4-n-octoxybenzophenone
2-Hydroxy-4-n-octoxybenzophenone
(2,2'-Thiobis(4-t-octylphenolato)-n-butylamine
nickel II
5-Chloro-2-hydroxybenzophenone
2,4-Dibenzoyl-resorcinol
4-Tert-butyl-phenylsalicylate
Phenyl salicylate
2,4-Dihydroxybenzophenone
4-Dodecyloxy-2-hydroxybenzophenone
p-Octylphenyl salicylate
Resorcinol monobenzoate
Hexamethylphosphoric triamide
2-Hydroxy-4-decyloxybenzophenone
2,2'-Dihydroxy-4,4'-dimethoxybenzophenone
2,2',4,4'-Tetrahydroxybenzophenone
Ethyl-2-cyano-3,3-diphenyl acrylate
2-Ethylhexyl-2-cyano-3,3-diphenyl acrylate 2(2'-hydroxy-5'-methylphenyl)benzotriazole
2(2'-hydroxy-3',5'-di-t-butylphenyl)-7-chloro-
  benzotriazole
Nickel acetylacetonate
Dipropylene glycol salicylate
Phenyl salicylate
Sucrose benzoate
Lauroyl-p-aminophenol
2-(2-hydroxy-3,5-di-t-amylphenyl)benzotriazole
Nickel-bis[2,2'-thiobis-(4-t-octylphenol)]
Nickel-bis(butyldithiocarbonate)
2-Hydroxy-4-(2-hydroxy-3-methacrylyloxy)-
  propoxybenzophenone
2-Hydroxy-4-(2-hydroxy-3-acrylyloxy)-propoxy-
  benzophenone.

In addition to the above mentioned additives the present invention also covers the use of secondary antioxidants. When such secondary antioxidants are employed in combination with the primary antioxidants the stabilization achieved is greater than the additive effect of the two antioxidants. Illustrative examples of such secondary antioxidants are distearylthiodipropionate, dilaurylthiodipropionate, trisnonylphenylphosphite, trilauryl-trithiophosphite and the like.

Often in order to achieve optimum stabilization it is necessary to employ buffers or corrosion inhibitors. Such additives can be conveniently employed in combination with other additives disclosed herein. Illustrative examples of buffers or corrosion inhibitors are calcium stearate, calcium oxide, magnesium stearate, epoxides and the like.

Dyesites can also be employed in combination with the various additives discussed herein. Illustrative examples of dyesites are poly(2-vinylpyridine), polyvinylpyrrolidone, polyvinylalcohol, 2,2'-thio-bis(4-t-octylphenol)n-butylamine nickel (II) nickel stearate, alumino-silicate composed of silicon dioxide and aluminum oxide, fluoro alcohols such as 2,2,3,3 - tetrafluorocyclobutyl methanol, 2,5 - di - (2,hydroxyphenyl)-thiazole[5,4-d-]thiazole, octadecyl/epichlorohydrin/piperazine (0.3/1.3/1 polycondensate), dichloroethane/hexamethylene diamine condensate/alkylated with lauryl chloride (1/1/0.12), bis-(2-mercaptoethyl) piperazine, piperazine, N-aminoethylpiperazine, 3 - methyl - 5 - amino-thiadiazole - 1,2,4,2-amino - 4,5 - dimethyl-thiazole - 1,3,2 - amino-triazole-1,3,4-poly(phenylene methyltriazole), poly(tetramethylene-N-benzal-aminotriazole), poly(phenylene acetaminotriazole), poly(2,4-di-methyl-6-vinyl pyridine), 75/25 copolymer 2-methyl-5-vinyl pyridine/N, n-dimethylacrylamide, 70/10/20 copolymer N-isopropylacrylamide/N,N-dimethylacrylamide/2-methyl-5-vinyl pyridine and the like. The dyesite can be added to a polymer to be dyed in an amount up to about 10% by weight of the polymer.

Polymers stabilized by incorporating therein various additives of this invention may also be dyed with various organic dyes or inorganic pigments. Illustrative examples of dyes and pigments are:

Kiton Fast Blue G—Acid Blue 43—C.I. 63000
Hadacid Blue A Conc.—Acid Blue 7—C.I. 42080
Polar Red 3B—Acid Red 134—C.I. 24810
Lexanol Yellow 6G—Acid Yellow 44—C.I. 23900
Wood Red B—Acid Red 115—C.I. 27200
Alizarine Yellow 2G—Yellow 1—C.I. 14025
Alizarine Red S—Wordant Red 3—C.I. 58005
Acid Black JVS—Acid Black 1—C.I. 20470
Setacyl brilliant blue E.G.—disperse blue 3—C.I. 61505
Blue, monochloro-4,5-diaminochrysazin
Blue, 1,4-diamino-N-(3-methoxypropyl)-2,3-anthraquinonedicarboximide (U.S. Pat. 2,753,356)
Blue, 1,4-diamino-N-(3-hydroxypropyl)-2,3-anthraquinonedicarboximide (U.S. Pat. 2,628,963)
Blue, 1,4-diamino-N-(2-hydroxyethyl)-2,3-anthraquinonedicarboximide (U.S. Pat. 2,628,963)
Violet, 1,4-dianilinoanthraquinone
Violet, 1-anilino-4-hydroxyanthraquinone
Yellow, 3-hydroxyquinophthalone
Red, 1-amino-4-hydroxy-2-phenoxyanthraquinone
Orange, disazo dye obtained by coupling diazotized aniline to 2,5-dimethoxyaniline, disazotizing the amino azo dye formed and coupling to phenol
Bone black—Black 9—C.I. 77267
Carbon black—Black 7—C.I. 77266
Indanthrone—Blue 22—C.I. 69810
Phthalo Green—Green 7—C.I. 74260
Phthalo Blue—Blue 15—C.I. 74160
Thioindigoid—Vat Violet 2 and 3—C.I. 72385 and 73395
Bon Maroon—
    Red 58—C.I. 15825
    Red 48—C.I. 15865
    Red 63—C.I. 15880
C.I. Solvent Black 29
C.I. Solvent Red 133
C.I. Solvent Blue 48
C.I. Solvent Green 21
C.I. Solvent Brown 42, 43 and 44
C.I. Solvent Black 30
C.I. Solvent Orange 57, 58 and 59
C.I. Solvent Red 129 to 132 and 134
C.I. Solvent Yellow 88 to 91
Pigment Orange 42
Pigment Red 180
Pigment Violet 34 and 35
Pigment Yellow 109 and 110
Titanium dioxide
Iron oxide
Chromium oxide
Chrome-cobalt-alumina
Cobalt aluminate
Zinc chromate
Manganese
Chrome-tin
Cadmium-mercury
Cadmium sulfo-selenide
Zinc oxide
Zinc sulfide and the like.

Still another type of additive that may be employed is a co-light stabilizer which may be hindered hydroxybenzoic acid esters such as 2,4-di-t-butylphenyl-3,5-di-t-butyl-4-hydroxybenzoate
methyl 3-methyl-5-isopropyl-4-hydroxybenzoate
ethyl 3,5-diisopropyl-4-hydroxybenzoate
propyl 3,5-di-sec-butyl-4-hydroxybenzoate
isobutyl 3,5-di-tert-amyl-4-hydroxybenzoate
amyl 3,5-di-tert-heptyl-hydroxybenzoate
decyl 3,5-di-tert-octyl-4-hydroxybenzoate
cyclohexyl 3,5-di-tert-amyl-4-hydroxybenzoate
lauryl 3-methyl-5-isoamyl-4-hydroxybenzoate
stearyl 3,5-diisopropyl-4-hydroxybenzoate
palmityl 3,5-di-tert-butyl-4-hydroxybenzoate
chloromethyl 3,5-di-tert-butyl-4-hydroxybenzoate
3-fluoropropyl 3,5-di-tert-amyl-4-hydroxybenzoate
allyl 3,5-di-tert-butyl-4-hydroxybenzoate
2-butenyl 3,5-diisopropyl-4-hydroxybenzoate
oleyl 5-methyl-5-tert-amyl-4-hydroxybenzoate
3-cyclohexenyl 3,5-di-sec-heptyl-4-hydroxybenzoate
ethane-1,2 di(3,5-diisopropyl-4-hydroxybenzoate)
propane-1,3 di(3,5-di-tert-amyl-4-hydroxybenzoate)
pentane-1,5 di(3,5-di-tert-octyl-4-hydroxybenzoate)
hexane-1,5 di(3-methyl-5-tert-butyl-4-hydroxybenzoate)
2-chloropropane-1,3 di(3,5-di-tert-butyl-4-hydroxybenzoate)
phenyl 3,5-diisopropyl-4-hydroxybenzoates
p-octylphenyl 3,5-di-tert-amyl-4-hydroxybenzoate
2',4'-dimethylphenyl 3,5-di-tert-octyl-4-hydroxybenzoate
p-isopropylphenyl 3-methyl-5-tert-amyl-4-hydroxybenzoate
naphthyl 3,5-di-tert-butyl-4-hydroxybenzoate
6-methylnaphthyl 3,5-di-tert-hexyl-4-hydroxybenzoate benzene-1,3,5-tri(3,5-diisopropyl-4-hydroxybenzoate
benzene-1,2-di(3,5-di-tert-amyl-4-hydroxybenzoate
p-chlorophenyl 3,5-di-tert-butyl-4-hydroxybenzoate
2,4-dibromophenyl 3,5-diisopropyl-4-hydroxybenzoate Organic phosphites can be employed in the instant invention as secondary antioxidants. The useful phosphites are trialkyl and triaryl phosphites or a mixture thereof and alkyl or aryl hydrogen phosphites, such as dialkyl hydrogen phosphites, diaryl hydrogen phosphites and alkyl aryl hydrogen phosphites. Illustrative examples are tridodecylphosphite, trioctadecylphosphite, trinonylphenylphosphite.

Still other additives that can be incorporated into the compositions of this invention are metal deactivators such as oxamide, oxanilide, N,N'-disalicylalaxaldihydrazide and N-salicylidene-N'-salicylhydrozine.

As already noted earlier, the instant invention envisions the use of any one or more of the above additives, in any combination, together with the metal phosphonates and phosphinates described above. By employing such a combination of additives in polymers, and especially in polyolefins, the resulting products attain an unusual degree of stabilization against degradation caused by oxygen, heat, ultraviolet light and the like. The supplementary additives, that is, antioxidants, secondary antioxidants, ultraviolet light absorbers, light absorbers, buffers or corrosion inhibitors, pigments or dyes and dyesites are generally used in the amount of from about 0.001 to about 5% by weight of each additive. The preferred range is from about 0.01 to about 1% by weight of the substrate (up to 3% for polymeric dyesites).

The stabilization system of the present invention is useful of stabilizing of organic materials normally subject to oxidative or thermal deterioration. Materials which are thus stabilized include synthetic organic polymeric substances such as vinyl resins formed from the polymerization of vinyl halides or from the copolymerization of vinyl halides with unsaturated polymerizable compounds, e.g., vinyl esters, α,β-unsaturated aldehydes and unsaturated hydrocarbons such as butadienes and styrene, poly-α-olefins such as polyethylene, polypropylene, polybutylene, polyisoprene and the like, including copolymers of poly-α-olefins, polyurethanes such as are prepared from polyols and organic polyisocyanates; polyamides such as polyhexamethylene adipamide and polycaprolactam, polyesters such as polymethylene or polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubrication oil of the aliphatic ester type, e.g., (di)2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil, and the like; hydrocarbon material such as gasoline, mineral oil, fuel oil, drying oil, cutting fluides, waxes, resins, and the like, fatty acids, soaps and the like.

Deterioration of most polymers caused by oxygen, heat or ultraviolet light is so slow at ambient temperatures, even in the absence of stabilizers, that testing of the effects of stabilizers generally must be conducted either at higher temperatures or in an accelerated artificial light exposure device in order to yield results in a convenient period of time. The tests conducted on polymers are described below:

LIGHT STABILIZATION TESTS (a) Sample preparation 25 mil plaques.—Unstabilized polypropylene powder (Hercules Profax 6501) is thoroughly blended with the indicated amounts of additives. The blended material is then milled on a two roll mill for 5 minutes at 182°. The milled sheet is then compression molded at 220° C. into 25 mil thick plaques under a pressure of 175 p.s.i. and water cooled in the press.

3 mil oriented monofilaments.—A portion of the milled sheet prepared above is charged into an Extrusion Plastometer and melt spun at 250° C. into a monofilament through the orifice normally used for obtaining a melt index. The filament is air cooled, wound on a set of hot Godet rolls and oriented 4:1 by a second set of cold Godet rolls. The monofilament is finally wound on a spool.

(b) Testing methods 25 mil plaques.—This test is conducted in a FS/BL unit, basically of the American Cyanamid design, which consists of 40 tubes of alternating fluorescent sun lamps and black lights (20 of each).) The 25 mil sample plaques which are mounted on white cardboard stock are placed on a rotating drum 2 inches from the bulbs. The plaques are exposed in the FS/BL unit until they become sufficiently brittle to break cleanly when bent 180°. The results are recorded as hours of exposure to embrittlement.

3 mil monofilaments.—The oriented monofilament is wound ten times around a 2 inch wide strip of white cardboard stock under slight tension and exposed in the FS/BL unit described above. At intervals of approximately 2 days the filaments are tested for brittlenes by the application of slight finger pressure across the strands. The results are recorded as hours of exposure until the time when the strands break easily.

Test results reported in Examples 1 to 15 were obtained according to the procedures described above. The amounts of the additives are expressed in weight percent based on the weight of the polymer.

Unstabilized polypropylene samples prepared by the above described procedures yield the following results:

| | Hours |
|---|---|
| 3 mil monofilament | 150 |
| 25 mil plaques | 50 |

EXAMPLE 1

Polypropylene was blend with the folowing additives:

0.5% 2(2'-Hydroxy-3',5'-di-t-butylphenyl)-7-chlorobenzotriazole
0.5% Nickel bis[(O-n-butyl-3,5-di-t-butyl-4-hydroxybenzyl)phosphonate]

| | Hours |
|---|---|
| 3 mil monofilament | 700 |
| 25 mil plaques | 1425 |

EXAMPLE 2

Polypropylene was blended with the following additives:

0.5% 2(2'-Hydroxy-3',5'-di-t-butylphenyl)-7-chlorobenzotriazole
0.5% O-n-Butyl-chloronickel-3,5-di-t-butyl-4-hydroxybenzyl phosphonate

| | Hours |
|---|---|
| 3 mil monofilament | 550 |
| 25 mil plaques | 1500 |

Improved results are obtained when in Examples 1 and 2 are additionally employed.

0.25% 2,6-Di-t-butyl-4-methylphenol
0.10% Dioctadecyl 3,5-di-t-butyl-4-hydroxybenzyl-phosphonate
0.20% Trilauryl phosphite
0.30% Distearylthiodipropionate

EXAMPLE 3

Polypropylene was blended with the following additives:

0.5% 2-Hydroxy-4-n-octoxybenzophenone
0.5% Nickel bis[(O-n-butyl-3,5-di-t-butyl-4-hydroxybenzyl)phosphonate]

|  | Hours |
|---|---|
| 3 mil monofilament | 1000 |
| 25 mill plaques | 1425 |

EXAMPLE 4

Polypropylene was blended with the following additives:

0.5% 2-Hydroxy-4-n-octoxybenzophenone
0.5% O-n-butyl-chloronickel-3,5-di-t-butyl-4-hydroxybenzyl phosphonate

|  | Hours |
|---|---|
| 3 mil monofilament | 550 |
| 25 mil plaques | 1400 |

Similar results are obtained when in Examples 3 and 4 the nickel phosphonates are replaced with
Nickel-bis-(3,5-di-t-butyl-4-hydroxybenzyl)benzenephosphinate
Nickel-bis-[(O-methyl-3,5-di-t-butyl-4-hydroxybenzyl)phosphonate]

EXAMPLE 5

Polypropylene is blended with the following additives:
0.25% Dioctadecyl 3,5-di-t-butyl-4-hydroxybenzylphosphonate
0.75% Nickel bis[(O-n-butyl-3,5-di-t-butyl-4-hydroxybenzyl)phosphonate]

|  | Hours |
|---|---|
| 3 mil monofilament | 350 |
| 25 mil plaques | 900 |

EXAMPLE 6

Polypropylene was blended with the following additives:
0.25% Octodecyl β-(3,5-di-t-butyl-4-hydroxyphenyl)propionate
0.75% O-n-butyl-chloronickel-3,5-di-t-butyl-4-hydroxybenzyl phosphonate

|  | Hours |
|---|---|
| 3 mil monofilament | 250 |
| 25 mil plaques | 900 |

Improved results are obtained when in Examples 5 and 6 are additionally added 0.3% dilaurylthiodipropionate
2.0% titanium dioxide pigment

EXAMPLE 7

Polypropylene was blended with the following additives:

0.10% Octadecyl β-(3,5-di-t-butyl-4-hydroxyphenyl)propionate
0.15% Distearylthiodipropionate
0.75% O-n-butyl-chloronickel-3,5-di-t-butyl-4-hydroxybenzyl phosphonate

|  | Hours |
|---|---|
| 3 mil monofilament | 325 |
| 25 mil plaques | 850 |

EXAMPLE 8

Polypropylene was blended with the following additives:

0.10% Octadecyl β-(3,5-di-t-butyl-4-hydroxy-phenyl)propionate
0.15% Distearylthiodipropionate
0.75% Nickel bis[(O-n-butyl-3,5-di-t-butyl-4-hydroxybenzyl(phosphonate]

|  | Hours |
|---|---|
| 3 mil monofilament | 400 |
| 25 mil plaques | 950 |

Slightly lower stabilization effectiveness is obtained when in Example 8 nickel bis[(O-n-butyl-3,5-di-t-butyl-4-hydroxybenzyl)phosphonate] is used in the amount of 0.1%.

Similarly good results are obtained when polyethylene, polybutene, poly-4-methyl-pentene-1, polyisoprene, polyurethane, polymethylene terephthalate, polyacetal and polyethylenedioxide are tested in Example 8 as the substrates in place of polypropylene.

EXAMPLE 9

Polypropylene was blended with the following additives:

0.1% Nickel bis[3,5-di-t-butyl-4-hydroxybenzyl)benzenephosphinate]
0.5% Distearylthiodipropionate 25 mil plaques _____hours__ 137

EXAMPLE 10

Polypropylene was blended with the following additives:

0.5% Nickel bis[(O-n-butyl-3,5-di-t-butyl-4-hydroxybenzyl)phosphonate]
0.5% 2(2'-Hydroxy-3',5'-di-t-butylphenyl) - 7 - chlorobenzotriazole

|  | Hours |
|---|---|
| 3 mil monofilament | 700 |
| 25 mil plaques | 1425 |

EXAMPLE 11

Polypropylene was blended with the following additives:

0.5% Nickel bis[(O-n-butyl-3,5-di-t-butyl-4-hydroxybenzyl)phosphonate]
0.5% 2-Hydroxy-4-n-oct xybenzophenone

|  | Hours |
|---|---|
| 3 mil monofilament | 1000 |
| 25 ml plaques | 1425 |

EXAMPLE 12

Polypropylene was blended with the following additives:

0.25% Nickel bis[(O - n-butyl-3,5-di-t-butyl-4-hydroxybenzyl)benzene
0.75% 2(2'-Hydroxy - 3',5' - di-t-butylphenyl)-7-chlorobenzotriazole

|  | Hours |
|---|---|
| 3 mil monofilament | 850 |
| 25 mil plaques | 1550 |

EXAMPLE 13

Polypropylene was blended with the following additives:

0.5% Nickel bis[(3,5-di-t-butyl-4-hydroxybenzyl)benzenephosphinate
0.1% Dioctadecyl 3,5-di-t-butyl - 4 - hydroxybenzylphosphonate 25 mil plaques _____hours__ 330

EXAMPLE 14

Polypropylene was blended with the following additives:

0.5% O-n-butyl-chloronickel - 3,5 - di-t-butyl-4-hydroxybenzyl
0.4% 2(2'-Hydroxy - 3',5' - di-t-butylphenyl)-7-chlorobenzotriazole
0.1% Octadecyl β-(3,5-di-t-butyl-4-hydroxyphenyl)-propionate

|  | Hours |
|---|---|
| 3 mil monofilament | 600 |
| 25 mil plaques | 1425 |

EXAMPLE 15

Polypropylene was blended with the following additives:

0.25% Nickel bis[3,5-di-t-butyl-4-hydroxybenzyl)benzenephosphinate
0.1% Dioctadecyl 3,5 - di-t-butyl-4-hydroxybenzylphosphonate
0.25% 2(2'-Hydroxy - 3',5' - di-t-butylphenyl)-7-chlorobenzotriazole 25 mil plaques _____ hours__ 370

EXAMPLE 16

A stabilized mineral oil composition is prepared by incorporating into a refined mineral oil of 183 S.U.S. at 100° F. (Regal Oil B, Texas Company).

0.001% Barium bis - [3,5-di-t-butyl-4-hydroxy-benzyl)-benzenephosphinate
0.001% Di-n-octadecyl - α,α' - bis-(3-t-butyl-4-hydroxy-5-methylbenzyl)malonate,
0.05% Calcium stearate,
0.001% Hexamethylphosphoric triamide and dilaurylthiodipropionate.

EXAMPLE 17

High-impact polystyrene resin containing elastomer (i.e., butadiene-styrene) is stabilized by incorporating 1% Nickel bis(O-octadecyl 3-methyl-4-hydroxy-5-t-butyl-benzylphosphonate),
0.5% 2,4,6-Tri-t-butylphenol
1.0% 2(2'-Hydroxy-3',5'-di-t-butylphenyl)-7-chlorobenzyltriazole,
0.25% Tris-nonylphenylphosphite,
0.20% Calcium oxida.

EXAMPLE 18

Commercial nickel-containing polypropylene is stabilized with 0.2% Tin bis-(O-butyl 3,5-di-t-butyl-4-hydroxy-benzylphosphonate
0.05% Nickel [(3,5-di-t-butyl-4-hydroxybenzyl)benzenephosphinate]acetate,
0.1% 2,4 - Bis-(n-octylthio)-6-(3,5-di-t-butyl-4-hydroxyaniline)-1,3,5-triazine,
0.05% 2-Hydroxy-4-n-octoxybenzophenone,
0.02% dilaurylthiodipropionate.
3.0% Poly(2-vinylpyridine) and
0.1% 2,4-Di-t-butylphenyl-3,5-di-t-butyl-4-hydroxybenzoate.

Said polypropylene composition is then dyed with the following dyes:
Kiton fast blue: C.I. 63000
Polar red: C.I. 24810
Lexanol yellow: C.I. 23900
Acid black JVS: C.I. 20470
Phthalo green: C.I. 74260
Bon maroon: C.I.15825

Equally good stabilization is obtained when in Example 18 2,4-bis-n(octylthio - 6 - (3,5-di-t-butyl-4-hydroxyaniline)-1,3,5 - triazine is replaced with 2,2'-methylene-bis-6-t-butyl-4-methylphenol), 2,6-di-t-butylhydroquinone, 4,4' - thiobis-(2-t-butyl-5-methylphenol), octadecyl-(3,5-dimethyl - 4 - hydroxybenzylthio)acetate or 1,1,3-tris-(5-t-butyl - 4 - hydroxy-2-methylphenyl)-butane.

EXAMPLE 19

Butadiene-styrene-acrylonitrile copolymer is stabilized with 2.0% Aluminum tris(O-butyl-3,5-di-t-butyl-4-hydroxybenzylphosphonate),
0.1% 2,4-Bis-(3,5-di-t-butyl-4-hydroxyphenoxy)-6-(no-octylthio)-1,3,5-triazine,
0.1% 2-Hydroxy-4-methoxy-2'-carboxybenzophenone,
0.05% Distearylthiodipropionate and
0.1% 3,5-Diisopropyl-4-hydroxybenzoate.

Equally good stabilization is attained when in Example 19 the aluminum phosphonate is replaced with Sodium(O-butyl-3,5-di-t-butyl-4-hydroxybenzylphosphonate)
Cupric bis[O-hexadecyl-1(3,5-di-t-butyl-4-hydroxyphenyl)propylphosphonate]
Ferric tris [-O-octadecyl β(3,5-di-t-butyl-4-hydroxyphenyl)ethylphosphonate]
Chromium tris (O-butyl 3,5-di-t-butyl-4-hydroxybenzylphosphonate)
Cobalt bis (O-butyl 3,5-di-t-butyl-4-hydroxybenzylphosphonate.

EXAMPLE 20

Nylon pellets are blended with 0.5% Stannous bis(O-butyl 3,5-di-t-butyl-4-hydroxybenzylphosphonate,
0.25% 1,4-Di(3,5-di-t-butyl-4-hydroxybenzyl)-2,3,5,6-tetramethylbenzene and
0.25% 2,4-Dihydroxybenzophenone.

Substantially the same degree of stabilization is obtained when 2,4-dihydroxybenzophenone is replaced with 2-Hydroxy-4-n-octoxybenzophenone
2-Chloro-2-hydroybenzophenone
4-t-Butyl-phenylsalicylate
Resorcinol monobenzoate
Hexamethylphosphoric triamide
Nickel bisoctyl phenyl sulfide
Ethyl-2-cyano-3,3-diphenylacrylate
2(2'-hydroxy-5'-methylphenyl)benzotriazole
Lauryl-p-aminophenol.

EXAMPLE 21

Polyvinylchloride is blended with the following additives to provide a stable composition:

1.5% Zinc 3,5-di-t-butyl-4-hydroxybenzylphosphonate
0.75% Dioctadecyl 3,5-di-t-butyl-4-hydroxybenzylphosphonate
0.5% 2-Ethylhexyl-2-cyano-3,3-diphenyl acrylate.

Similarly good stabilization is obtained when in Example 21 polyvinyl chloride is replaced with polyurethane, polymethylene terephthalate and polyacetal.

OUTDOOR EXPOSURE TESTS (a) Sample preparation 15 denier oriented multifilaments: The additives are dissolved in distilled methylene chloride and blended with polypropylene (Hercules Profax 6501) in a Hobart mixer. A Buffer (such as calcium stearate) and a pigment (such as titanium dioxide) are added dry to the polymer blend. To facilitate moisture removal all blends are vacuum dried shortly before extrusion.

Samples are processed as follows:

1. Compound and pelletizing:
   1" Extruder: L/D=20/1 at 40 r.p.m.
   Melt temperature: 450° F.
2. Multifilament:
   1" extruder: L/D=24/1 at 20 r.p.m.
   Spinnerette: 10 hole, 20 mil diameter/hole
   Melt temperature: 500° F.

Air cooling was accomplished by spinning into a cooling tower 6' x 6" x 5" fitted with a fan delivering 65 c.f.m. of air.

3. Filament take-up:
The cooled multifilament was wound on Godet rolls at a filament speed of 500 ft./min.
4. Orientation:
Godet temperature: 257° F.
Orientation ratio: 3:1

(b) Test methods for weathering stability

Mockdyed knitted multifilament was exposed 45° south direct in Florida. Exposures were begun November 1. Tensile measurements were performed at each exposure interval with Instron Model TM.

6.5 mil oriented monofilaments: The additives are solvent blended (e.g. methylene chloride) with powdered polypropylene (Hercules Profax 6501). The solvent is then removed at room temperature in a vacuum oven with a slight air bleed. The dry mixture is melt-extruded at 450° F. and pelletized. The pellets are reextruded through a monofilament, melt spun and hot oriented 4:1 by means of a set of cold and hot Godet rolls to give 6.5 mil diameter (nominal) monofilaments.

The test results reported in Examples 22 to 33 show the percentage of retention of the original tenacity by a fiber after having been exposed to the indicated number of kilolangleys (kly.). A langley is a measure of energy accumulated by the fiber. It is common that some fibers after initial exposure increase their orientation. For this reason in some examples the percent of retention is more than 100. This usually occurs at lower energy levels, such as at 25 kly.

EXAMPLE 22

Polypropylene filaments containing the following additives were prepared as described above:

0.50% Nickel bis[(O-n-butyl-3,5-di-t-butyl-4-hydroxybenzyl)phosphonate]
0.10% Dioctadecyl 3,5-di-t-butyl-4-hydroxybenzylphosphonate
0.25% Distearylthiodipropionate
0.10% Calcium stearate
2.00% Titanium dioxide

| | Percent |
|---|---|
| 25 kly. | 107.0 |
| 50 kly. | 53.0 |

EXAMPLE 23

Polypropylene filaments containing the following additives were prepared as described above:

0.10% Nickel-bis-[2,2'-thiobis(4-t-octyl-phenolate)]
0.10% Dioctadecyl 3,5-di-t-butyl-4-hydroxybenzylphosphonate
0.25% Distearylthiodipropionate
0.10% Calcium stearate
2.00% Titanium dioxide

| | Percent |
|---|---|
| 25 kly. | 77.3 |
| 50 kly. | 31.0 |

EXAMPLE 24

Polypropylene filaments containing the following additives were prepared as described above:

0.50% Nickel bis[(O-n-butyl-3,5-di-t-butyl-4-hydroxybenzyl)phosphonate]
0.10% Dioctadecyl 3,5-di-t-butyl-4-hydroxybenzylphosphonate
0.25% Distearylthiodipropionate
0.50% 2-Hydroxy-4-n-octoxybenzophenone
0.10% Calcium stearate
2.00% Titanium dioxide

| | Percent |
|---|---|
| 25 kly. | 118.0 |
| 50 kly. | 80.0 |

EXAMPLE 25

Polypropylene filaments containing the following additives were prepared as described above:

0.50% Nickel bis[(O-n-butyl-3,5-di-t-butyl-4-hydroxybenzyl)phosphonate]
0.10% Dioctadecyl 3,5-di-t-butyl-4-hydroxybenzylphosphonate
0.25% Distearylthiodipropionate
0.50% 2(2'-hydroxy-3',5'-di-t-butylphenyl)-7-chlorobenzotriazole
0.10% Calcium stearate
2.00% Titanium dioxide

| | Percent |
|---|---|
| 25 kly. | 94.1 |
| 50 kly. | 68.7 |

EXAMPLE 26

Polypropylene filaments containing the following additives were prepared as described above:

0.50% Nickel bis[(O-n-butyl-3,5-di-t-butyl-4-hydroxybenzyl)phosphonate]
0.10% Dioctadecyl 3,5-di-t-butyl-4-hydroxybenzylphosphonate
0.25% Distearylthiodipropionate
0.50% 2-(2'-hydroxy-3',5'-di-t-anylphenyl)-1,2,3,-benzotriazole
0.10% Calcium stearate
2.00% Titanium dioxide

| | Percent |
|---|---|
| 25 kly. | 92.6 |
| 50 kly. | 72.4 |

EXAMPLE 27

Polypropylene filaments containing the following additives were prepared as described above:

0.10% Dioctadecyl 3,5-di-t-butyl-4-hydroxybenzylphosphonate
0.25% Distearylthiodipropionate
0.50% 2(2'-hydroxy-3',5'-di-t-butylphenyl)-7-chlorobenzotriazole
0.10% Calcium stearate
2.00% Titanium dioxide 50 kly.: 31.3% (tenacity retained)

The above formulation containing 0.2% dioctadecyl 3,5-di-t-butyl-4-hydroxybenzylphosphonate 50 kly.: 38.5% (tenacity retained)

It should be noted that in this example the polypropylene formulation contained no organonickel compound of this invention.

EXAMPLE 28

Polypropylene filaments containing the following additives were prepared as described above:

0.10% Dioctadecyl 3,5-di-t-butyl-4-hydroxybenzylphosphonate
0.25% Distearylthiodipropionate
0.50% 2-Hydroxy-4-n-octoxybenzophenone
0.10% Calcium stearate
2.00% Titanium dioxide 50 kly.: 33.9% (tenacity retained)

The above formulation containing 0.20% Dioctadecyl 3,5-di-t-butyl-4-hydroxybenzylphosphonate 50 kly.: 31.0% (tenacity retained)

EXAMPLE 29

Polypropylene filaments containing the following additives were prepared as described above:

0.20% Dioctadecyl 3,5-di-t-butyl-4-hydroxybenzylphosphonate
0.25% Distearylthiodipropionate
0.10% Calcium stearate
2.00% Titanium dioxide 50 kly.: 28.2% (tenacity retained)

It should be noted that in this example the polypropylene formulation contained neither the organonickel compound of this invention nor an ultraviolet light absorber.

EXAMPLE 30

Polypropylene filaments containing the following additives were prepared as described above:

1.0% Nickel bis-[(3,5-di-t-butyl-4-hydroxybenzyl)benzenephosphinate]
0.1% Dioctadecyl 3,5-di-t-butyl-4-hydroxybenzylophosphonate
0.1% Calcium stearate 40 kyl.: 72% tensile strength retained, 88% elongation retained

EXAMPLE 31

Polypropylene filaments containing the following additives were prepared as described above:

1.0% Nickel bis-[(3,5-di-t-butyl-4-hydroxybenzyl)benzenephosphinate]
0.1% Dioctadecyl 3,5-di-t-butyl-4-hydroxybenzylphosphonate
0.1% Calcium stearate
0.5% 2(2'-hydroxy-3',5'-di-t-butylphenyl)-7-chlorobenzotriazole 40 kly.: 97% tensile strength retained, 93% elongation retained

EXAMPLE 32

Polypropylene filaments containing the following additives were prepared as described above:

0.5% Nickel bis-[(3,5-di-t-butyl-4-hydroxybenzyl)benzenephosphinate]
0.1% Dioctadecyl 3,5-di-t-butyl-4-hydroxybenzylphosphonate
0.1% Calcium stearate 40 kly.: 94% tensile strength retained, 90% elongation

EXAMPLE 33

Polypropylene filaments prepared in the same way as in Examples 27 to 29, except without the stabilizing additives:

40 kly.: About 20% tensile strength retained, 20% elongation retained

EXAMPLE 34

Polypropylene was blended with the following additives:
0.1% Nickel bis[(3,5-di-t-butyl-4-hydroxybenzyl)benzenephosphonate]
0.1% Dioctadecyl 3,5-di-t-butyl-4-hydroxybenzylphosphonate
0.1% Calcium stearate 6 mil monofilament: 40 kly., 72% tensile strength retained; 70 kly., 63% tensile strength retained; 90 kly., 5% tensile strength retained Similar result is obtained when in this example dioctadecyl 3,5-di-t-butyl-4-hydroxybenzylphosphonate is replaced with Octadecyl 3-(3,5-di-t-butyl-4-hydroxyphenyl)propionate
Tetra-[3-(3,5-di-t-butyl-4-hydroxyphenyl)propionyloxymethyl]-methane
2,4-Bis-(4-hydroxy-3,5-di-t-butylphenoxy)-6-(n-octylthioethylthio)-1,3,5-triazine

EXAMPLE 35

Polypropylene was blended with the following additives:

0.5% Nickel bis[(3,5-di-t-butyl-4-hydroxybenzyl)benzenephosphinate
0.1% Dioctadecyl 3,5-di-t-butyl-4-hydroxybenzylphosphonate
0.5% 2(2'-Hydroxy-3',5'-di-t-butylphenyl)-7-chlorobenzotriazole
0.1% Calcium stearate 6 mil monofilament: 40 kly., 97% tensile strength retained; 70 kly., 90% tensile strength retained; 90 kly., 84% tensile strength retained.

EXAMPLE 36

Polypropylene was blended with the following additives:

0.5% Nickel bis[(3,5-di-t-butyl-4-hydroxybenzyl)benzenephosphinate
0.1% Dioctadecyl 3,5-di-t-butyl-4-hydroxybenzylphosphonate
0.5% 2-Hydroxy-4-n-octoxybenzophenone
0.1% Calcium stearate 6 mil monofilament: 40 kly., 94% tensile strength retained; 70 kly., 91% tensile strength retained; 90 kly., 88% tensile strength retained When 6 mil monofilament samples were prepared as described above from unstabilized polypropylene, after 40 kly of exposure only 20% of tensile strength was retained.

Examples 37 and 38 below show how many kilolangleys of outdoor exposure polypropylene filament prepared as described above could withstand and still retain 50% of the original tenacity.

EXAMPLE 37

Polypropylene filaments containing the following additives were prepared as described above:

0.20% Nickel bis[O-n-butyl-3,5-di-t-butyl-4-hydroxybenzyl)phosphonate]
0.80% 2(2'hydroxy-3',5'-di-t-butylphenyl)-7-chlorobenzotriazole
0.07% Calcium stearate
0.20% Titanium dioxide After 55 kly.: 50% (tenacity retained)

EXAMPLE 38

Polypropylene filaments containing the following additives were prepared as described above:

0.20% Nickel bis[O-n-butyl-3,5-di-t-butyl-4-hydroxybenzyl)phosphonate]
0.80% 2-Hydroxy-4-n-octoxybenzophenone
0.07% Calcium stearate
0.20% Titanium dioxide After 90 kly.: 50% (tenacity retained)

EXAMPLE 39

Polypropylene is stabilized with the following additives:

0.25% Nickel bis[(O-n-butyl-3,5-di-t-butyl-4-hydroxybenzyl)phosphonate
0.25% Dioctadecyl 3,5-di-t-butyl-4-hydroxybenzylphosphonate
0.50% 2(2'-Hydroxy-3',5'-di-t-butylphenyl)-7-chlorobenzotriazole

EXAMPLE 40

Polypropylene is stabilized with the following additives:

0.25% Nickel bis[(O-n-butyl-3,5-di-t-butyl-4-hydroxy-benzyl)phosphonate
0.25% Dioctadecyl 3,5-di-t-butyl-4-hydroxybenzyl-phosphonate
0.25% 2(2'-Hydroxy-3',5'-di-t-butylphenyl)-7-chloro-benzotriazole
0.25% 2,4-Di-t-butylphenyl-3,5-di-t-butyl-4-hydroxy-benzoate

What is claimed is:

1. A stabilizing composition consisting essentially of (a) organophosphoro-metal compound selected from (1) metal-organophosphonate having the formula $$[E]_m M_x [G]_p$$

wherein

M comprises a metal having an available valence of from 1 to 4;
$x$ has a value of from 1 to 2;
G is an anion having an available valence of from 1 to 3; and
E is of the formula:

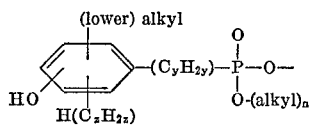

and wherein $z$ has a value of from 0 to 6,
$y$ has a value of from 1 to 4,
$n$ has a value of from 0 to 1,
$m$ has a value of from 1 to 2, and
$p$ has a value of from 0 to 3, $n$, $m$, $p$ and $x$ being so selected as to satisfy the expression $$\frac{(2-n)_m}{x} + \frac{(r)_p}{x} = v$$

wherein $r$ is the valence of anion G and has a value of from 1 to 3, and $v$ is an available valence of M, or (2) metal-organophosphinate having the formula

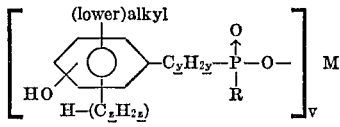

wherein

M is a metal or metal complex cation, this cation having an available valence of from 1 to 4;
$z$ has a value of from 0 to 6;
$y$ has a value of from 1 to 4;

(b) a phenolic antioxidant is selected from:

(b1)         Q—(CH$_2$)$_w$—A wherein Q is

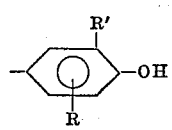

A is

—CR(COOR'')$_2$

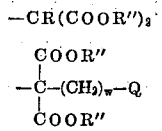

R is hydrogen or lower alkyl
R' is lower alkyl
R'' is alkyl group having from 6–24 carbon atoms
$w$ is an integer from 1 to 4

(b2)         Q—R
(b3)         Q—C$_w$H$_{2w}$—Q
(b4)         R—O—Q
(b5)         Q—S—Q (b6)

$$Q-(CH_2)_w-S-(CH_2)_w-\overset{\overset{O}{\|}}{C}-OR''$$

(b7) 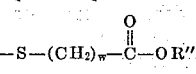

wherein T is hydrogen or Q as defined above;

(b8) 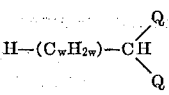

wherein B$^1$, B$^2$ and B$^3$ are hydrogen, methyl or Q, provided that when B$^1$ and B$^3$ are Q then B$^2$ is hydrogen and when B$^3$ is Q then B$^1$ and B$^2$ are hydrogen (b9) 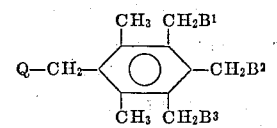

wherein

Z is NHQ, —S—D or —O—Q
D is alkyl group having from 6–12 carbon atoms or —(C$_w$H$_{2w}$)—S—R''

(b10) 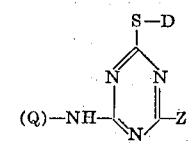

wherein Z' is —O—Q, —S—D or —S—(C$_w$H$_{2w}$)—SD (b11) 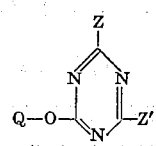

wherein $p$ is an integer from 2 to 4 and
R''' is a tetravalent radical selected from aliphatic hydrocarbons having from 1 to 30 carbon atoms, aliphatic mono- and dithioethers having from 1 to 30 carbon atoms, aliphatic mono- and diethers having from 1 to 30 carbon atoms (b12) 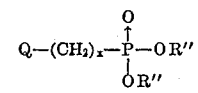

(c) an ultraviolet light absorber selected from (1) a benzophenone having the formula

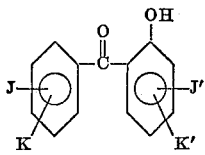

wherein

J is hydrogen, alkyl, carboxy or hydroxy group,
K is alkyl, alkoxy or alkenylcarboxyalkoxy group,
J' is hydrogen, alkyl, aroyl, halogen, alkoxy, or hydroxy group and
K' is alkyl, aroyl or hydroxy, said alkyl groups in J, K, J' and K' having up to 18 carbon atoms, and (2) a benzotriazole having the formula

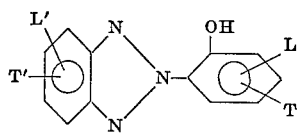

wherein

L is hydrogen, alkyl, hydroxy or alkoxy group,
T is hydrogen, alkyl or alkoxy group,
L' is hydrogen, alkyl or halogen group and
T' is hydrogen or alkyl group, said alkyl groups in L, T, L' and T' having up to 18 carbon atoms;

(d) an organosulfur synergist selected from dilaurylthiodipropionate and distearylthiodipropionate; (e) a benzoate co-light stabilizer having the formula

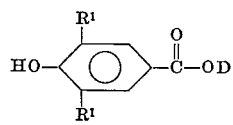

wherein each $R^1$ is independently a lower alkyl group having from 3 to 8 carbon atoms, preferably branched and most preferably tert-alkyl, and D is alkyl group having up to 24 carbon atoms, aryl, or alkyl substituted aryl groups, said alkyl substitute having up to 8 carbon atoms, preferably phenyl or alkylphenyl and most preferably 4-tert-alkylphenyl and 2,4-di-tert-alkylphenyl as additives being in the concentration of 0.001 to 5% by weight of a substrate.

2. A stabilizing composition according to Claim 1 wherein the organophosphoro-metal compound is a metal-organophosphonate selected from

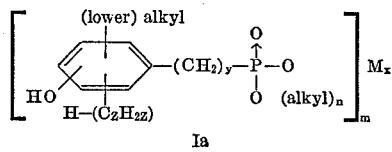

wherein M, z, y, n, m and x have the values defined above;

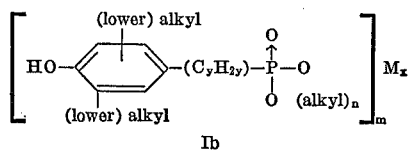

wherein M, y, n, m and x have the values defined above; and

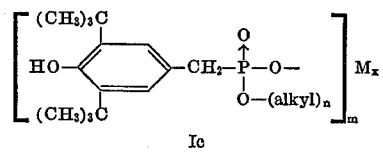

3. A stabilizing composition according to Claim 2 wherein M is nickel.

4. A stabilizing composition according to Claim 1 comprising (a) said metal-organophosphonate is nickel bis[O-n-butyl-3,5-di-t-butyl-4-hydroxybenzyl)phosphonate]
(b) said phenolic antioxidant is di-n-octadecyl-α(3-t-butyl-4-hydroxy-5-methylbenzyl)malonate
(c) said ultraviolet light absorber is a benzotriazole or benzophenone UV absorber
(d) said secondary antioxidant is distearylthiodipropionate or dilaurylthiodipropionate.

5. A stabilizing composition according to Claim 4 wherein said phenolic antioxidant (b) is octadecyl β-(3,5-di-t-butyl-4-hydroxyphenyl)propionate.

6. A stabilizing composition according to Claim 4 wherein said phenolic antioxidant (b) is 2,2'-methylene-bis(6-t-butyl-4-methylphenol).

7. A stabilizing composition according to Claim 4 wherein said phenolic antioxidant is 4,4'-thiobis-(2-t-butyl-5-methylphenol).

8. A stabilizing composition according to Claim 4 wherein said phenolic antioxidant (b) is 1,1,3-tris(3-t-butyl-4-hydroxy-6-methylphenyl)butane.

9. A stabilizing composition according to Claim 4 wherein said phenolic antioxidant (b) is 2,4-bis-(n-octylthio) - 6 - (3,5 - di-t-butyl - 4 - hydroxyaniline) - 1,3,5-triazine.

10. A stabilizing composition according to Claim 4 wherein said phenolic antioxidant (b) is 2,4-bis(3,5-di-t-butyl-4-hydroxyphenoxy)-6-(n-octylthio)-1,3,5-triazine.

11. A stabilizing composition according to Claim 4 wherein said phenolic antioxidant is 2,4-bis-(4-hydroxy-3,5 - di-t-butylphenoxy) - 6 - (n-octylthioethylthio) - 1,3,5-triazine.

12. A stabilizing composition according to Claim 4 wherein said phenolic antioxidant (b) is tetra-[3-(3',5', di-t-butyl - 4' - hydroxyphenyl)propionyloxymethyl] methane.

13. A stabilizing composition according to Claim 4 wherein said phenolic antioxidant (b) is 1,1,1-tris-[3-(3', 5' - di-t-butyl - 4 - hydroxyphenyl)propionyloxymethyl] propane.

14. A stabilizing composition according to Claim 4 wherein said phenolic antioxidant (b) is dioctadecyl 3,5-di-t-butyl-4-hydroxybenzylphosphonate.

15. A stabilizing composition consisting essentially of
(a) 0.01 to 1% by weight of a substrate of nickel bis-[(O-ethyl - 3,5 - di-t-butyl-4-hydroxybenzyl) phosphonate]
(b) 0.01 to 1% by weight of a substrate of dioctadecyl 3,5-di-t-butyl-4-hydroxybenzylphosphonate
(c) 0.01 to 1% by weight of a substrate of n-octyl-3,5-di-t-butyl-4-hydroxybenzoate
(d) 0.01 to 1% by weight of a substrate of 2(2'-hydroxy-3',5'-di-t-butylphenyl)5-chlorobenzotriazole.

References Cited

UNITED STATES PATENTS

| | | | |
|---|---|---|---|
| 3,310,575 | 3/1967 | Spivack | 252—400 A |
| 3,474,147 | 10/1969 | Lehikolnen | 252—400 A |
| 3,112,272 | 11/1963 | Echols | 252—400 A |
| 3,558,747 | 1/1971 | Meltsner | 252—400 A |
| 3,565,855 | 2/1971 | Meltsner | 260—45.95 D |
| 3,539,531 | 11/1970 | Drake et al. | 252—400 A |
| 3,297,631 | 1/1967 | Bown et al. | 260—45.95 D |
| 3,335,109 | 8/1967 | Pines | 260—45.95 D |
| 3,280,070 | 10/1966 | DiBattista | 260—45.95 D |
| 3,145,176 | 8/1964 | Knapp et al. | 257—400 A |
| 3,244,650 | 4/1966 | Hecker et al. | 252—400 A |

LELAND A. SEBASTIAN, Primary Examiner

I. GLUCK, Assistant Examiner

U.S. Cl. X.R.

252—182; 260—45.75 N, 45.75 R, 45.95 D